(12) United States Patent
Blomme et al.

(10) Patent No.: US 7,878,521 B2
(45) Date of Patent: Feb. 1, 2011

(54) BICYCLE FRAME WITH DEVICE CAVITY

(75) Inventors: David J. Blomme, Madison, WI (US); Dan Dacko, Madison, WI (US); Barry Lewis, Waterloo, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 585 days.

(21) Appl. No.: 11/735,846

(22) Filed: Apr. 16, 2007

(65) Prior Publication Data
US 2008/0252038 A1 Oct. 16, 2008

(51) Int. Cl.
B62K 19/30 (2006.01)
(52) U.S. Cl. ................. 280/281.1; 280/288.3; 280/278; 280/279; 324/166; 324/167
(58) Field of Classification Search .............. 280/281.1, 280/283.3, 278, 279; 324/166, 167
See application file for complete search history.

(56) References Cited

U.S. PATENT DOCUMENTS

| | | | | |
|---|---|---|---|---|
| 4,008,903 | A | * | 2/1977 | Ramond ................... 280/279 |
| 4,071,892 | A | * | 1/1978 | Genzling ................... 701/200 |
| 4,633,216 | A | * | 12/1986 | Tsuyama ................... 340/432 |
| 5,008,647 | A | | 4/1991 | Brunt et al. |
| 5,170,161 | A | | 12/1992 | Sakurai |
| 5,177,432 | A | | 1/1993 | Waterhouse et al. |
| 5,497,143 | A | * | 3/1996 | Matsuo et al. .............. 340/432 |
| 5,511,435 | A | * | 4/1996 | Kitamura et al. ........... 73/865.9 |
| 6,192,300 | B1 | * | 2/2001 | Watarai et al. ................ 701/1 |
| 6,229,454 | B1 | * | 5/2001 | Heikkila et al. ........ 340/870.14 |
| 6,281,674 | B1 | | 8/2001 | Huang |
| 6,325,401 | B1 | * | 12/2001 | Fujii .......................... 280/274 |
| 6,415,662 | B1 | | 7/2002 | Huang |
| 6,669,218 | B1 | * | 12/2003 | Sinyard et al. .............. 280/274 |
| 6,848,701 | B2 | * | 2/2005 | Sinyard et al. .............. 280/283 |
| 6,978,162 | B2 | | 12/2005 | Russell et al. |
| 7,253,610 | B2 | * | 8/2007 | Nagae ......................... 324/174 |
| 7,393,125 | B1 | * | 7/2008 | Lai ............................. 362/473 |
| 2002/0014756 | A1 | * | 2/2002 | Fujii .......................... 280/274 |
| 2004/0084872 | A1 | | 5/2004 | Sinyard et al. |
| 2006/0049822 | A1 | | 3/2006 | Watson |
| 2006/0108183 | A1 | * | 5/2006 | Watarai ....................... 188/2 D |
| 2006/0140272 | A1 | | 6/2006 | Watson |
| 2006/0197303 | A1 | | 9/2006 | Sinyard et al. |
| 2008/0035431 | A1 | * | 2/2008 | Vroomen et al. ......... 188/24.21 |
| 2008/0122596 | A1 | * | 5/2008 | Montagnon et al. ......... 340/432 |

FOREIGN PATENT DOCUMENTS

WO WO 2006-071753 7/2006

* cited by examiner

*Primary Examiner*—Lesley Morris
*Assistant Examiner*—Marlon A Arce
(74) *Attorney, Agent, or Firm*—Boyle Frederickson, S.C.

(57) ABSTRACT

A bicycle frame having a cavity constructed to receive a sensor device. The cavity has a shape and a contour that generally matches a shape and a contour of the sensor device. Such a configuration maintains the aerodynamic contour of the frame when the sensor device is positioned in the cavity. An optional plug occupies the cavity when the sensor device is not positioned therein. Preferably, the sensor device is constructed to wirelessly communicate bicycle operation information to a receiver that is remotely located relative to the sensor device. More preferably, the cavity is formed in a fork of the bicycle and the sensor device is configured to monitor operation of a front wheel and wirelessly communicate the operation information to the remote receiver.

19 Claims, 3 Drawing Sheets

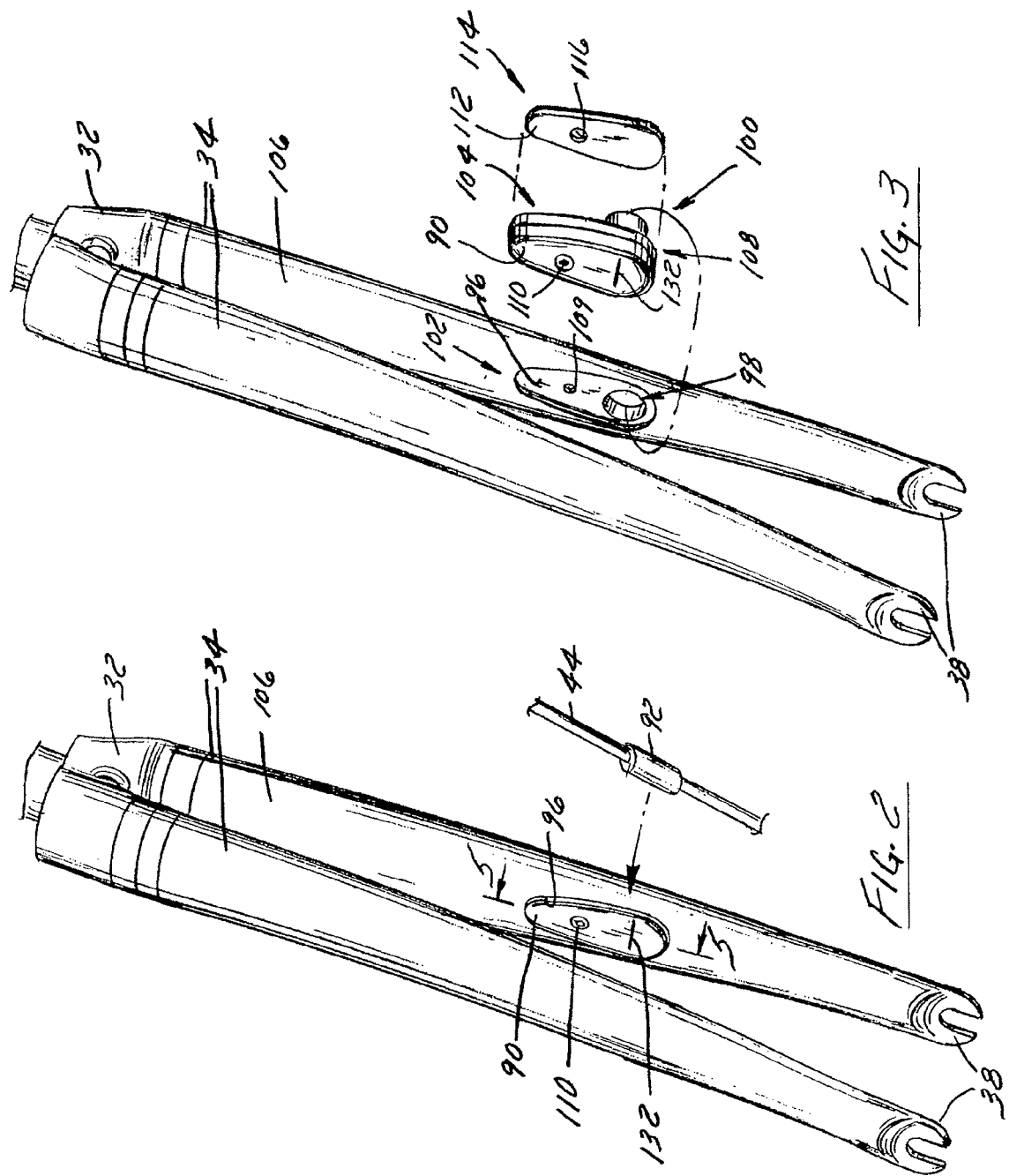

BICYCLE FRAME WITH DEVICE CAVITY

BACKGROUND OF THE INVENTION

The present invention relates generally to bicycles and, more particularly, to bicycle frames and operation monitoring systems.

During cycling, cyclists frequently desire to know information relative to their performance. Desired information can include trip specific information such as speed, distance traveled, duration, and cadence and/or comparative information such as information related to a comparison of past and current performance. Frequently, operational information is acquired by a sensor system that monitors bicycle performance and generates the requested information. That portion of the sensor system configured to monitor bicycle performance generally includes a detector that is positionally fixed relative to an operator attached to a mobile component of the bicycle, such as a wheel or a crank arm. The operator attached to the wheel repeatedly passes the detector thereby providing information relative to movement of the wheel and thereby movement of the bicycle. Frequently, the detector communicates the monitored information to a receiver which communicates the desired information to the rider.

Frequently, the detector is attached to a fork or tube of the bicycle frame and the operator is attached to a spoke of the wheel or crank arm, respectively. A clamp or bracket is commonly disposed between the detector and the fork. Similar structure is commonly required to attach the operator to the spoke. Although such a configuration allows for dynamic monitoring of rider performance, such systems are not without their respective drawbacks.

Operation of the sensor system requires that the detector and the operator be generally radially aligned. That is, the detector and the operator must be attached to the bicycle such that the operator passes within an operating proximity of the detector. The sensor system may operate improperly, if at all, if the detector and operator are not properly aligned. Failure to properly attach the detector and operator pair may lead to inaccurate calibration of the sensor system.

As is commonly understood, a location proximate a center of a wheel rotates faster than positions located radially outward therefrom. If a detector and operator pair is configured for operation at a preferred radius, positioning the detector and operator at a location other than the desired radius will yield inaccurate motion information. For example, if a detector and operator pair is formatted for operation at a position six inches from a center of rotation, and a user mounts the detector and operator pair at a position five inches from the center of rotation, the sensor system will provide inaccurate motion information and indicate a speed that is above an actual speed. Inversely, if the user mounts the detector and operator pair at a position radially outward from the intended position, the sensor system will likewise generate inaccurate motion information and communicate to the user that they are traveling slower than they actually are. Accordingly, such systems rely heavily on the cyclist's ability to accurately position the components of the sensor system.

The operation of such sensor systems is also dependent upon the ability to securely attach the components of the sensor system to the bicycle such that the sensor components maintain a relatively fixed position. Inadvertent translation of the components of the sensor system can result in inaccurate operation of the system. That is, impacts and vibrations associated with aggressive riding or rough terrain are frequently communicated to the structure of the bicycle. These impacts or vibrations can result in inaccurate alignment of the detector and operator pair thereby rendering the information acquired by the sensor system inaccurate or renders the sensor system completely inoperable. Other impacts, such as inadvertent contact of the sensor components with other objects such as the rider, obstacles, other cyclists, or the ground, can also result in misalignment of the detector and operator pair. Accordingly, it is desired to provide a system of maintaining the components of the sensor system in their desired positions.

Known sensor systems also detract from the aerodynamic performance of the bicycle as well as the aesthetic appearance of bicycles so quipped. Commonly, the sensor components extend from the bicycle assembly and form substantial discontinuities in the aerodynamic contour of the bicycle. Such a configuration is a substantial concern for competitive riders.

Another concern for users of such sensor systems is security of the respective components of the system. Simple mechanical fasteners or brackets frequently secure the individual components of the sensor system to the bicycle. Left unattended, persons with ill intentions may abscond with one or more of the components of the sensor system. Such a problem has been recognized and resolved by others in providing systems having components that removably engage mating structures that are less costly and can be left attached to the bicycle. Although such systems allow a user to remove the components of the sensor system when the bicycle is left unattended, such systems are commonly susceptible to the misalignment errors discussed above.

Accordingly, it would be desirable to have a system and method of providing a bicycle that is configured for operation with a sensor system wherein the components of the sensor system can be secured to the bicycle without substantially interfering with the aerodynamic function of the bicycle. It is further appreciated that any such system should be configured to wirelessly communicate the operation information to a location where it is readily accessible by a rider.

BRIEF DESCRIPTION OF THE INVENTION

The present invention provides a system and method of forming a bicycle that overcomes the aforementioned drawbacks. A bicycle according to one aspect of the invention includes a frame having a cavity constructed to receive a sensor device. Preferably, the cavity has a shape and a contour that generally matches a shape and a contour of the sensor device. An optional plug is disclosed that occupies the cavity when the sensor device is not positioned therein. Preferably, the sensor device is constructed to wirelessly communicate bicycle operation information to a remote receiver. More preferably, the cavity is formed in a fork or frame tube of the bicycle and the sensor device is configured to monitor operation of a front wheel or crank arm and wirelessly communicate the operation information to the remote receiver.

A bicycle frame according to another aspect of the invention has a first portion for engaging a front tire, a second portion for engaging a rear tire, and a third portion for supporting a rider. A recess is formed in one of the portions of the frame for receiving a first sensor component configured to wirelessly communicate with a second sensor component. Preferably, the recess is formed in a fork or tube and the first sensor component is a sensor configured to monitor passage of an operator attached to a wheel and communicate the monitored information to the second sensor component that is a remote receiver. Such a construction reduces the aesthetic and aerodynamic impact of a sensor system.

According to a further aspect of the invention, a bicycle that includes a front wheel, a rear wheel, and a frame constructed to support the front wheel and the rear wheel is disclosed. A cavity is formed in the frame and has a contour that generally matches a contour of a sensor unit such that the sensor unit can be removably attached in the cavity of the frame. The sensor unit is further configured to wirelessly communicate with a receiver positioned remotely from the sensor unit. Such a construction provides a sensor system that can monitor a number of bicycle operating parameters such as speed, cadence, travel distance, power or watts and ride duration.

Another aspect of the invention discloses a method of constructing a bicycle. The method includes forming a frame to support a pair of wheels and forming a cavity in an exterior surface of a portion of the frame. The cavity is contoured to receive a sensor that is constructed to wirelessly communicate with a receiver positioned remotely from the sensor. Accordingly, such a method provides a bicycle configured to provide for the incorporation of one or more sensor systems within a profile of the bicycle frame. Such a configuration further reduces the potential for theft and/or damage of the components of the sensor system.

These and various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings:

FIG. 2 is a perspective view of a fork of the bicycle shown in FIG. 1 with the sensor device positioned therein.

FIG. 3 is a perspective view similar to FIG. 2 with the sensor device removed from the fork.

DETAILED DESCRIPTION OF THE PREFERRED EMBODIMENT

Figure 1:
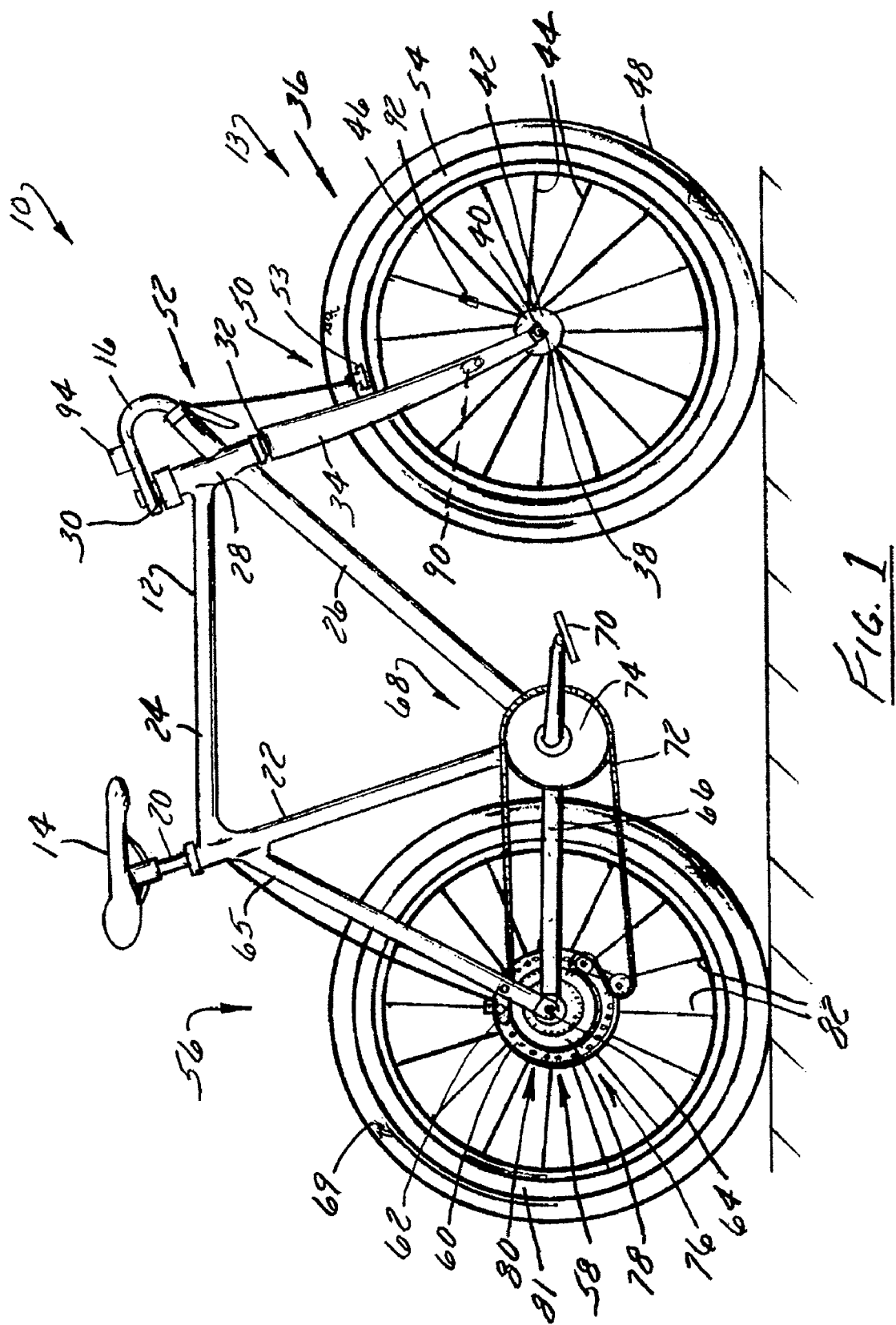
FIG. 1 is an elevational view of the bicycle equipped with a cavity positioned sensor device according to the present invention.

FIG. 1 shows a bicycle 10 having a frame 12 constructed to accommodate a sensor system 13 according to the present invention. Bicycle 10 includes a seat 14 and handlebars 16 that are attached to frame 12. A seat post 20 is connected to seat 14 and slidably engages a seat tube 22 of frame 12. A top tube 24 and a down tube 26 extend forwardly from seat tube 22 to a head tube 28 of frame 12. Handlebars 16 are connected to a stem 30 that passes through head tube 28 and engages a fork crown 32. A pair of forks 34 extend from generally opposite ends of fork crown 32 and are constructed to support a front wheel assembly 36 at an end thereof or fork tip 38. Fork tips 38 engage generally opposite sides of an axle 40 that is constructed to engage a hub 42 of front wheel assembly 36. A number of spokes 44 extend from hub 42 to a rim 46 of front wheel assembly 36. A tire 48 is engaged with rim 46 such that rotation of tire 48, relative to forks 34, rotates rim 46 and hub 42.

Bicycle 10 includes a front brake assembly 50 having an actuator 52 attached to handlebars 16 and a pair of brake pads 53 positioned on generally opposite sides of front wheel assembly 36. Brake pads 53 are constructed to engage a brake wall 54 of rim 46 thereby providing a stopping or slowing force to front wheel assembly 36. A rear wheel assembly 56 includes a disc brake assembly 58 having a rotor 60 and a caliper 62 that are positioned proximate a rear axle 64. A rear wheel 69 is positioned generally concentrically about rear axle 64. Understandably, front wheel assembly 36 and rear wheel assembly 56 could be equipped with a brake assembly generally similar to front brake assembly 50 or disc brake assembly 58.

A seat stay 65 and a chain stay 66 offset rear axle 64 from a crankset 68. Crankset 68 includes a pedal 70 that is operationally connected to a chain 72 via a chain ring or sprocket 74. Rotation of chain 72 communicates a drive force to a rear section 76 of bicycle 10 having a gear cluster 78 positioned thereat. Gear cluster 78 is generally concentrically orientated with respect to rear axle 64 and includes a number of variable diameter gears.

Gear cluster 78 is operationally connected to a hub 80 of rear wheel 69. A number of spokes 82 extend radially between hub 80 and a rim 81 of rear wheel 69 of rear wheel assembly 56. As is commonly understood, rider operation of pedals 70 drives chain 72 thereby driving rear wheel 69 which in turn propels the rider of bicycle 10. Sensor system 13 is constructed to monitor motion or operation of bicycle 10 or the rider thereof. Sensor system 13 includes a detector 90 and an operator 92, such as a magnet, that is constructed and positioned to interact with detector 90. Sensor system 13 includes a receiver 94 that is constructed to wirelessly communicate with detector 90. As described herein, it is appreciated that a sensor, a sensor device, a sensor component, or sensor unit, is any device configured to communicate or monitor another component. That is, these terms generically define any of the operator, the detector, the receiver, or a device configured to perform any one or combination of these functions. With respect to the preferred embodiment shown in FIG. 1, movement of operator 92 relative to detector 90 generates bicycle movement information that is wirelessly communicated from detector 90 to receiver 94. Receiver 94 is constructed to communicate the desired information to a rider.

Referring to FIGS. 2 and 3, operator 92 was attached to a spoke 44 a front wheel assembly 36 such that rotation of the wheel translates operator 92 past detector 90. Detector 90 is received in a cavity formed in one of forks 34. Recess 96 has a first portion 98 constructed to engage a first section 100 of detector 90 and a second portion 102 constructed to generally receive a second section 104 of detector 90. Recess 96 is formed in a contour 106 of fork 34 such that a contour 108 of detector 90 generally matches contour 106 of fork 34 when detector 90 is positioned in recess 96. Another recess 109 is formed within recess 96 and is constructed to engage a fastener 110 constructed to pass through detector 90. Alternatively, an insert may be provided that operatively engages fork 34 and has a threaded opening formed therethrough for engaging fastener 110. Preferably, this insert would be formed of a metal material.

An optional plug 112 is also provided and has a contour 114 that generally matches contour 106 of fork 34 such that plug 112 can engage recess 96 of fork 34 when detector 90 is not positioned therein. Such a construction maintains the aerodynamic function of fork 34 when detector 90 is not connected to bicycle 10. Optional plug 112 includes an opening 116 constructed to receive fastener 110 for securing plug 112 within recess 96. Alternatively, plug 112 may be provided with a number of projections such that the plug snap-fittingly engaged recess 96 thereby alleviating the need for fastener 110 to secure plug 112 to fork 34. As that shown in FIG. 3, detector 90, optional plug 112, and recess 96 have comparable shapes and contours such that either of detector 90 or plug 112 can be snuggly received within recess 96 to maintain the aerodynamic function of fork 34.

Figure 4:
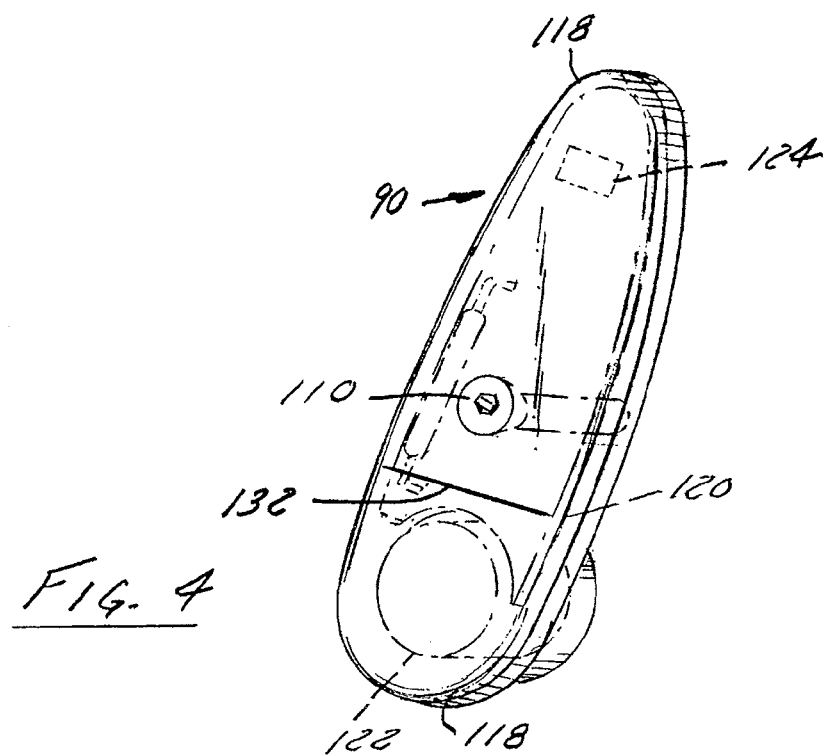
FIG. 4 is a perspective view of the sensor device shown in FIG. 3.

As shown in FIG. 4, detector 90 includes a housing 118 constructed to generally enclose a control circuit 120 and a power source 122. Power source 122 powers control circuit 120 such that the control circuit 120 can detect passage of operator 92 past detector 90. Control circuit 120 includes a transmitter 124 constructed to communicate the detected information to receiver 94. Preferably, transmitter 124 is configured to wirelessly communicate with receiver 94 at a frequency of around 2.4 GHz. Understandably, other frequency or communication protocols may be applicable. It is appreciated that either one of detector 90 and receiver 94 generate the desired information from the detected information for communication to a rider. That is, it is envisioned that either of detector 90 or receiver 94 be configured to manipulate the sensed data to generate the motion information which is desired by a cyclist.

Figure 5:
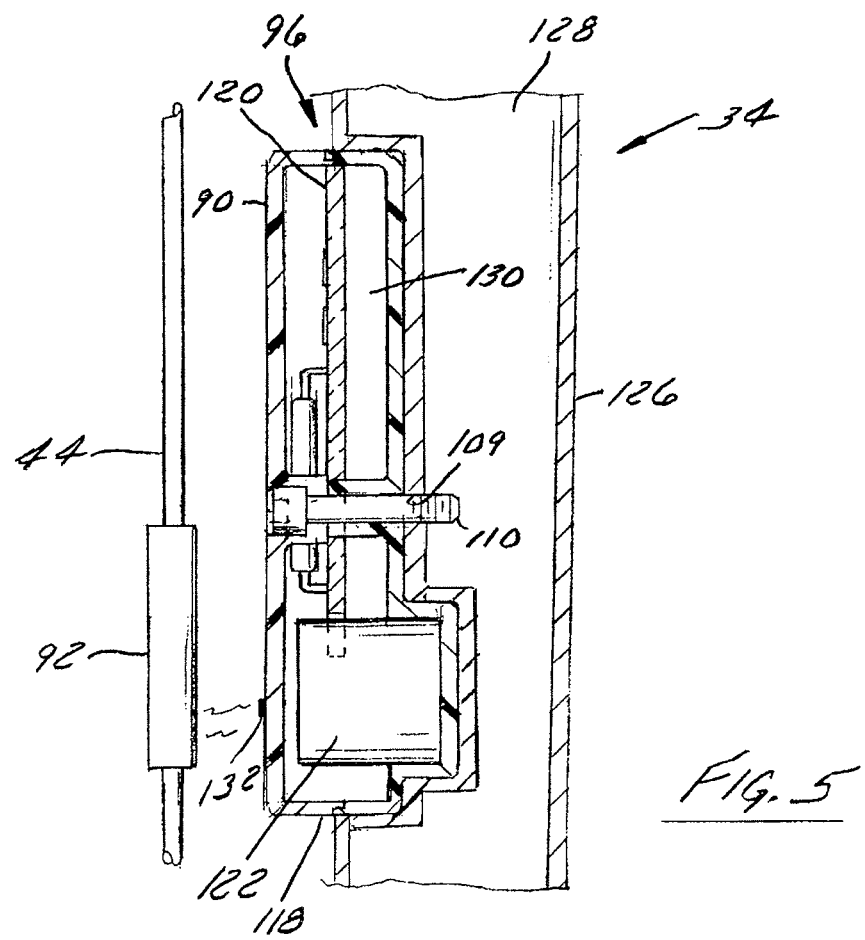
FIG. 5 is a cross-sectional view taken along line 5-5 shown in FIG. 2 of the fork of the bicycle with the sensor device positioned in the cavity of the fork.

Referring the FIG. 5, fork 34 has a generally hollow construction such that a wall 126 generally encloses a cavity 128. Wall 126 is constructed to form recess 96 and recess or opening 109. Opening 109 is formed in wall 126 and is constructed to threadingly engage fastener 110 thereby securing detector 90 to fork 34 generally within recess 96. Housing 118 generally encloses control circuit 120 and power source 122 within a cavity 130 of housing 118. Fastener 110 passes through opposing sides of housing 118 and control circuit 120 to threadingly engage opening 109. The corresponding and generally non-concentric association of housing 118 of detector 90 to recess 96 of fork 34 prevents rotation of detector 90 relative to fork 34 during manipulation of fastener 110. Operator 92 is configured to interface with control circuit 120 such that the passage of spoke 44 past fork 34 indicates information relevant to the movement of the wheel.

Detector 90 is further provided with an operator position indicator 132. Operator position indicator 132 is formed on housing 118 of detector 90 and configured to provide an indication as to the location of operator 92 along the length of spoke 44. Generally aligning operator 92 with position indicator 132 ensures that operator 92 is preferably aligned with detector 90 to provide accurate wheel motion information. Such a construction ensures that even novice users can appropriately position operator 92 along spoke 44 such so that the motion information generated by sensor system 13 is accurate with respect to the distance of detector 90 and operator 92 from an axis of rotation of the wheel of bicycle 10.

During operation of bicycle 10, detector 90 generates a signal that is used to derive bicycle operational data such as speed, distance traveled, duration of ride, watts, and/or cadence. It is further appreciated that detector 90 or receiver 94 be configured to record and maintain ride information such that comprehensive performance information can be maintained to allow a rider to compare a current ride performance to past ride performance.

It is also understood and appreciated that the respective locations of detector 90 and operator 92 could be generally reversed. That is, detector 90 could be secured to the spoke 44 and operator 92 affixed to fork 34. Such an orientation would locate the component of sensor system 13 that detects motion of a movable part of bicycle 10 on the part that moves relative to frame 12. It is further understood and appreciated that the sensing system includes a detector configured to monitor movement of the rider such that the rider performs the function of the operator thereby eliminating the need for a supplemental operator. For example, it is envisioned that a detector be received in a cavity formed in a portion of the frame proximate a rider rather than proximate the wheel. Such a detector is configured to monitor passage of a rider's body relative to the detector. As the rider manipulates pedals 70, a portion of the rider's leg passes the detector thereby providing the signal monitored by the detector. Understandably, recess 96 could be formed in any of seat post 20, seat tube 22, top tube 24, down tube 26, seat stays 65, or chain stays 66 and be constructed to receive a detector, operator, sensor, or receiver therein. It is further appreciated that sensor system 13 monitor movement of any of one or both wheels, a portion of a rider, a crank arm, or any other portion of the bicycle or rider that is movable relative to another portion of the bicycle or frame.

In addition to the locational independence of the individual components of sensor system 13, it is further appreciated that a sensing system according to the present invention is operable with a number of detection and communication protocols. With respect to detection protocols, it is appreciated that eddy current, magnet sensors, current switches, capacitance sensors, piezoelectric switches, potentiometers, photoelectric sensors or the like could be used to monitor the motion of a wheel or portion of a rider relative to the frame of the bicycle. With respect to the communication protocol between the receiver and detector, it is appreciated that the wireless communication includes any of radiofrequency, laser, photoelectric, infrared, acoustic signal communication protocols.

It is further appreciated that, although receiver 94 is shown as attached to handlebar 16, the information receiver could be independent or integrated into other cycling components such as a helmet, glasses, gloves, etc. It is also appreciated that the receiver could be integrated into a more complete cycling device or other electronic system such a PDA, a cell-phone, a watch, or other electronic cycling specific accessory. A monitoring system according to the present invention provides a performance monitoring system that dynamic, simple to use, and convenient to integrate into a bicycle and a cycling routine.

Therefore, one embodiment of the invention includes a bicycle frame having a cavity constructed to receive a sensor device. Preferably, the cavity has a shape and a contour that generally matches a shape and a contour of the sensor device. An optional plug is disclosed that occupies the cavity when the sensor device is not positioned therein. Preferably, the sensor device is constructed to wirelessly communicate bicycle operation information to a remote receiver. More preferably, the cavity is formed in a fork of the bicycle and the sensor device is configured to monitor operation of a front wheel and wirelessly communicate the operation information to the remote receiver.

Another embodiment of the invention includes a bicycle frame having a first portion for engaging a front tire, a second portion for engaging a rear tire, and a third portion for supporting a rider. A recess is formed in one of the portions of the frame for receiving a first sensor component configured to wirelessly communicate with a second sensor component. Preferably, the recess is formed in a fork and the first sensor component is a sensor configured to monitor passage of an operator attached to a wheel and communicate the monitored information to the second sensor component that is a remote receiver.

A further embodiment of the invention is a method of constructing a bicycle. The method includes forming a frame to support a pair of wheels and forming a cavity in an exterior surface of a portion of the frame. The cavity is contoured to receive a sensor that is constructed to wirelessly communicate with a receiver positioned remotely from the sensor. Accordingly, such a method provides a bicycle configured to provide for the incorporation of one or more sensor systems within a profile of the bicycle frame. Such a configuration further reduces the potential for theft and/or damage of the components of the sensor system.

The present invention has been described in terms of the preferred embodiment, and it is recognized that equivalents, alternatives, and modifications, aside from those expressly stated, are possible and within the scope of the appending claims.

What is claimed is:

1. A bicycle frame comprising:
   a first portion for engaging a front tire;
   a second portion for engaging a rear tire;
   a third portion for supporting a rider; and
   a recess formed in one of the portions for receiving a first sensor component configured to wirelessly communicate with a second sensor component, the recess and the first sensor component having generally matching contours so that the first sensor component can be snuggly engaged in the recess so that the one of the portions having the recess aerodynamically overlaps a portion of the sensor positioned in the recess; and
   a fastener engaged with the bicycle frame and the first sensor component for maintaining a rigid connection between the first sensor component and the bicycle frame.

2. The frame of claim 1 wherein the first sensor component is one of a detector, an operator, a transmitter, and a receiver and the second sensor component is another of a detector, an operator, a transmitter, and a receiver.

3. The frame of claim 1 wherein the recess is formed in a fork and the first sensor component is 1) a detector constructed to detect passage of an operator attached to a wheel and 2) a transmitter constructed to wirelessly communicate with a receiver positioned proximate a handlebar.

4. The frame of claim 1 further comprising a plug constructed to be received in the recess when the first sensor component is removed therefrom.

5. The frame of claim 4 wherein the plug has a shape and a contour that generally matches at least a shape and a contour of an exterior surface of the frame portion having the recess.

6. The frame of claim 1 wherein the recess includes a first section constructed to receive a power source of the first sensor component and a second section constructed to receive a transmitter of the first sensor component.

7. The frame of claim 6 wherein the first sensor component includes a housing that is constructed to receive the power source and the transmitter and be snuggly received in the recess.

8. The frame of claim 1 wherein the first sensor component and the second sensor component cooperate to monitor at least one of vehicle speed, cadence, distance, and time.

9. A bicycle comprising:
   a front wheel;
   a rear wheel;
   a frame constructed to support the front wheel and the rear wheel;
   a cavity formed in the frame and having a contour constructed to generally match a contour of a sensor unit such that the sensor unit can be removably attached in the cavity and wirelessly communicate with a receiver positioned remotely from the sensor unit and so that a portion of the sensor unit contained in the cavity is isolated by the frame from an air flow over the frame having the cavity;
   the sensor unit having a housing constructed to generally enclose a controller, a power source, and a transmitter; and
   a passage formed through the housing and constructed to receive a fastener to secure the sensor unit in the cavity.

10. The bicycle of claim 9 wherein the cavity is formed in a fork and the sensor unit is one of a detector and an actuator and the other of the detector and actuator is attached to the front wheel such that the detector and actuator cooperate to monitor operation of the front wheel.

11. The bicycle of claim 9 wherein the housing is constructed to generally align with the frame when the sensor unit is positioned in the cavity.

12. The bicycle of claim 9 wherein the sensor unit is a cadence sensor and the cavity is formed in one of a chain stay, a seat stay, a seat tube, a top tube, a down tube, or a head tube.

13. The bicycle of claim 9 further comprising a plug for being secured to the frame when the sensor unity is not connected to the frame.

14. A method of constructing a bicycle comprising:
   forming a frame to support a pair of wheels;
   forming a cavity in an exterior surface of a portion of the frame; and
   contouring the cavity to receive a sensor whose contour generally matches the contour of the cavity so as to maintain an aerodynamic function of the portion of the frame when the sensor is positioned in the cavity, the sensor further being constructed to wirelessly communicate with a receiver positioned remotely from the sensor; and
   providing a fastener that cooperates with the sensor and the frame for securing the sensor in the cavity.

15. The method of claim 14 further comprising forming the cavity in a portion of the frame that extends generally along a wheel.

16. The method of claim 15 further comprising attaching an actuator to a part of the bicycle that is movable with respect to the cavity such that an operation parameter can be determined by passage of the actuator past the wireless sensor.

17. The method of claim 16 wherein the operation parameter is at least one of bicycle speed, distance traveled, duration of ride, cadence, and average speed.

18. The method of claim 14 further comprising providing a plug having a shape that generally corresponds to a shape of the sensor so that the plug occupies the cavity when the sensor is removed therefrom and maintains a contour of the frame over the cavity.

19. A bicycle comprising:
   a front wheel;
   a rear wheel;
   a frame constructed to support the front wheel and the rear wheel;
   a cavity formed in the frame and having a contour constructed to generally match a contour of a sensor unit such that the sensor unit can be removably attached in the cavity and wirelessly communicate with a receiver positioned remotely from the sensor unit;
   a fastener that cooperates with the frame and the sensor unit for removably securing the sensor unit within the cavity of the frame; and
   a plug securable to the frame in the cavity with the fastener when the sensor unit is not connected to the frame.

* * * * *